US012810499B2

(12) United States Patent
Okuma

(10) Patent No.: US 12,810,499 B2
(45) Date of Patent: Nov. 24, 2026

(54) GRAPH DISPLAY DEVICE CONTROL DISPLAY STATE TRANSITIONS AMONG DISPLAY SCREENS, DISPLAY CONTROL METHOD, AND PROGRAM

(71) Applicant: CASIO COMPUTER CO., LTD., Tokyo (JP)

(72) Inventor: Kentaro Okuma, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 146 days.

(21) Appl. No.: 18/906,184

(22) Filed: Oct. 4, 2024

(65) Prior Publication Data

US 2025/0131621 A1 Apr. 24, 2025

(30) Foreign Application Priority Data

Oct. 20, 2023 (JP) ................................ 2023-180742

(51) Int. Cl.
*G06T 11/26* (2026.01)

(52) U.S. Cl.
CPC .......... *G06T 11/26* (2026.01); *G06T 2200/24* (2013.01)

(58) Field of Classification Search
CPC ...... G06F 15/02; G06T 11/26; G06T 2200/24
USPC .......................................................... 345/440
See application file for complete search history.

(56) References Cited

U.S. PATENT DOCUMENTS

| | | | | |
|---|---|---|---|---|
| 2014/0078058 A1* | 3/2014 | Suzuki | ................ | G06F 15/0225 345/157 |
| 2014/0317570 A1 | 10/2014 | Endo | | |
| 2014/0365947 A1* | 12/2014 | Karoji | ................. | G06F 3/04847 715/773 |

FOREIGN PATENT DOCUMENTS

| | | |
|---|---|---|
| JP | 2003150562 A | 5/2003 |
| JP | 2014241029 A | 12/2014 |
| JP | 2022105733 A | 7/2022 |

OTHER PUBLICATIONS

Extended European Search Report (EESR) dated Mar. 20, 2025, issued in counterpart European Application No. 24205307.2.

* cited by examiner

*Primary Examiner* — Jacinta M Crawford
(74) *Attorney, Agent, or Firm* — Holtz, Holtz & Volek PC

(57) ABSTRACT

A graph display device includes a controller that manages display state transitions. In a first display state, multiple pieces of function formula information are displayed on a display. When a user selects a specific function formula and instructs to display its corresponding graph, the controller switches to a second display state showing that graph. In response to a first predetermined operation being detected in the second display state, the controller determines whether the selected function formula includes definition information in which a value input to a variable included in the function formula is associated with the predetermined variable. In response to determining that the definition information is included, the controller switches to a third display state including both the graph and an input area for designating the value of the variable, without switching the display state to the first display state.

6 Claims, 8 Drawing Sheets

GRAPH DISPLAY DEVICE CONTROL DISPLAY STATE TRANSITIONS AMONG DISPLAY SCREENS, DISPLAY CONTROL METHOD, AND PROGRAM

CROSS-REFERENCE TO RELATED APPLICATIONS

This application claims priority based on Japanese Patent Application No. 2023-180742 filed in Japan on Oct. 20, 2023, the entire contents of which are incorporated herein.

FIELD

The present disclosure relates to a graph display device, a display control method, and a recording medium.

BACKGROUND

Some calculation devices called scientific calculators are capable of displaying a graph of a function formula (a calculation formula including a variable). For example, in JP 2003-150562 A, a coordinate setting screen in a coordinate system for drawing a graph and a graph display screen are simultaneously displayed, and when a coordinate setting is determined, a graph is displayed on a full screen based on the determined coordinate setting.

SUMMARY

A graph display device according to an aspect including a controller: when specific function formula information is selected in a first display state in which a plurality of pieces of function formula information is displayed on a display unit and when an operation of an instruction to display a graph corresponding to the selected function formula information is detected, switches a display state of the display unit from the first display state to a second display state in which a graph of a function formula included in the selected function formula information is displayed; when a first predetermined operation is detected in the second display state, determines whether or not the function formula included in the selected function formula information includes definition information in which a value input to a variable included in the function formula is associated with the predetermined variable; and when it is determined that the definition information is included, switches to a third display state in which a screen including the graph and an area for designating the value in the definition information is displayed, without switching the display state of the display unit to the first display state.

DETAILED DESCRIPTION

Hereinafter, embodiments of the present disclosure will be described in detail with reference to the drawings. In the present specification, drawing a graph is intended to express a relationship between a variable (e.g., an x value) and a solution (e.g., a y value) in a function formula on a predetermined plane or space, and displaying the drawn graph is intended to visualize and display on a display unit 12 only a designated range of the predetermined plane or space in which the relationship between the variable and the solution in the function formula is expressed. Therefore, "displaying the drawn graph" and similar expressions in the present specification include a case where some or all of the drawn graph is not displayed on the display unit 12. Note that the function formula in the present specification includes a function formula of a constant function (zero-order function) such as y=1 (y=0·x+1).

First Embodiment

Figure 1:
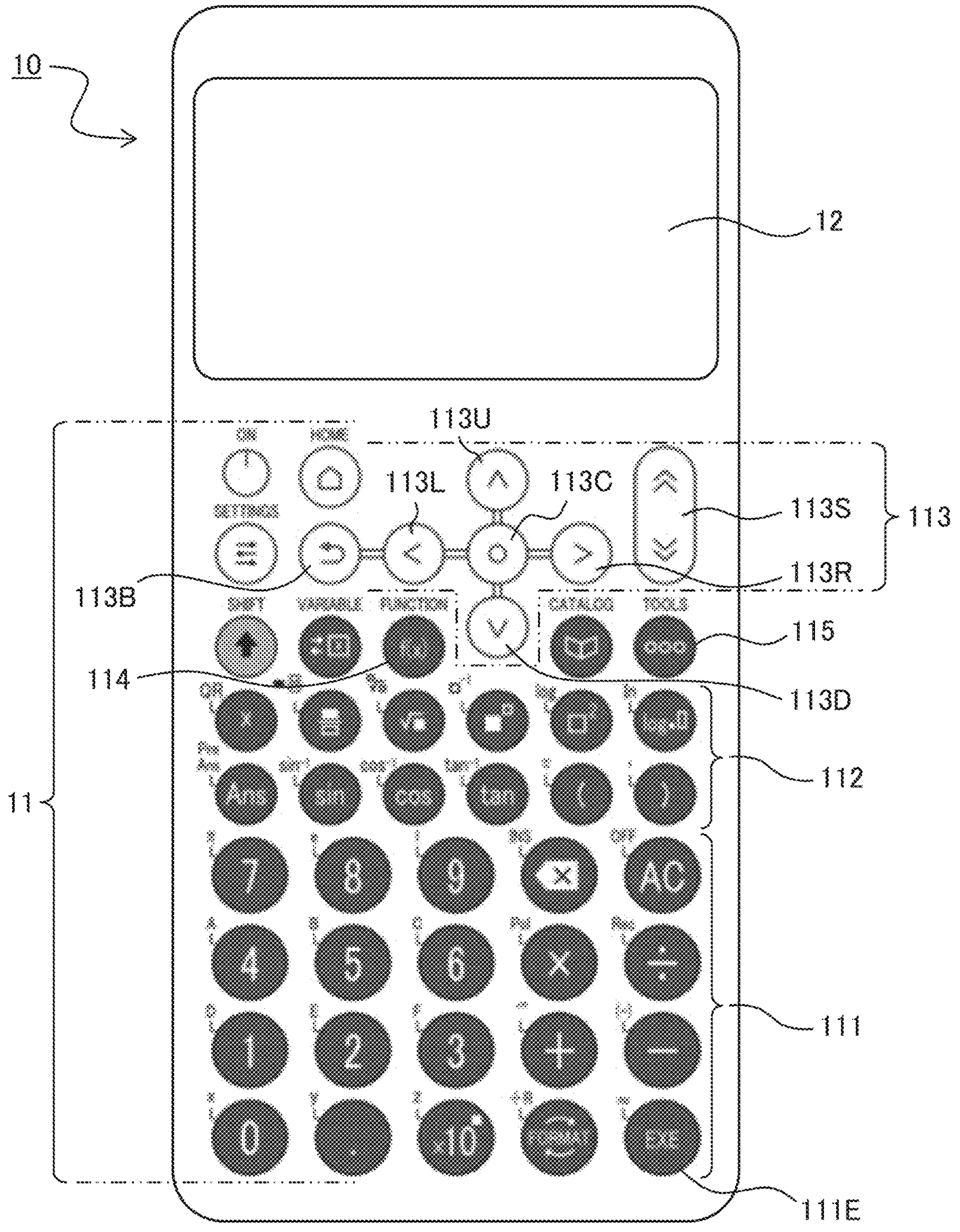
FIG. 1 is a front view illustrating an example of an external configuration of a scientific calculator according to a first embodiment.

In a scientific calculator 10 exemplified in FIG. 1, a key input unit 11, a display unit 12, and a battery power supply (not illustrated) are provided on a main surface of a device housing. The device housing may have such a small size that a user can sufficiently hold the device housing with one hand and can operate the device with one hand, with a distance (a dimension in the thickness direction) between a main surface and a back surface thereof being sufficiently small as compared with dimensions in the longitudinal direction and the transverse direction of the main surface on which the key input unit 11, the display unit 12, etc. are provided. The scientific calculator 10 may be an example of a graph display device capable of drawing and displaying a graph of a function formula input thereto.

The key input unit 11 includes a numerical value/operation symbol key group 111 for inputting a numerical value or a mathematical expression or instructing execution of calculation, a function key group 112 for inputting various functions, and a cursor key group 113 for performing an operation of moving a cursor displayed on the display unit 12, an operation of selecting a data item, or the like.

The numerical value/operation symbol key group 111 includes [0] to [9] (numeric value) keys, [+], [−], [×], and [÷] (four arithmetic operators) keys, an [EXE] (execution) key 111E, an [AC] (clear) key, and the like. The function key group 112 includes a [x] (variable) key, a [□/□] (fraction) key, a [√□] (root) key, a [sin] (sine) key, a [cos] (cosine) key, a [tan] (tangent) key, and the like.

The cursor key group 113 includes a [↑] (up) key 113U (first key), a [↓] (down) key 113D (second key), a [←] (left) key 113L (third key), a [→] (right) key 113R (fourth key), and a [↑↓] (scroll) key 113S. The cursor key group 113 may include a confirmation key 113C and a back key 113B exemplified in FIG. 1. By providing the cursor key group 113 to be positioned to the right on the front side of the main body of the scientific calculator 10 where the key input unit 11 is provided, it is possible to improve operability for a user who is primarily right-handed.

In addition, between the function key group 112 and the cursor key group 113 in the key input unit 11, a function formula input screen activation key 114 for displaying a screen for inputting a function formula, a tools (TOOLS) key 115 for displaying a tool screen for selecting a process executable with respect to a displayed graph, and the like are arranged. The function formula input screen activation key 114 and the tools key 115 may be regarded as keys included in the function key group 112. The display unit 12 may be a dot-matrix type liquid crystal display unit or the like. Note that the external configuration of the scientific calculator 10, e.g., the number and arrangement of keys of the key input unit 11, is not limited to the configuration exemplified in FIG. 1.

Figure 2:
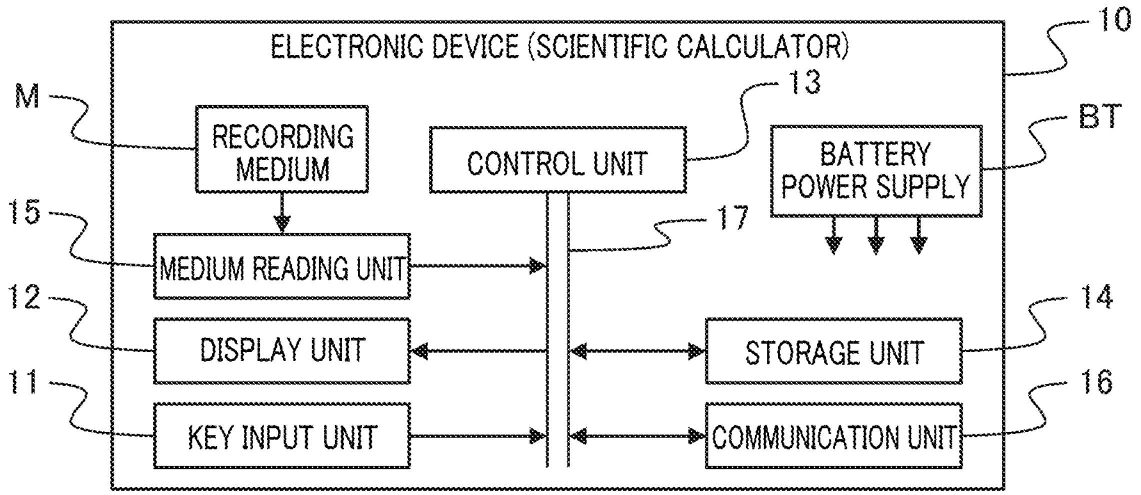
FIG. 2 is a block diagram illustrating an example of a configuration of an electronic circuit of the scientific calculator.

As exemplified in FIG. 2, an electronic circuit in the scientific calculator 10 according to the present embodiment includes a key input unit 11, a display unit 12, a battery power supply BT, a control unit 13, a storage unit 14, a medium reading unit 15, and a communication unit 16. The key input unit 11, the display unit 12, the control unit 13, the storage unit 14, the medium reading unit 15, and the communication unit 16 are connected to each other via a bus 17. The key input unit 11, the display unit 12, the control unit 13, the storage unit 14, the medium reading unit 15, and the communication unit 16 are connected to the battery power supply BT by power supply wiring (not illustrated), and operate by power supplied from the battery power supply BT. The battery power supply BT may be a combination of a plurality of types of batteries (e.g., a combination of a button battery, a coin battery, and a cylindrical battery).

The control unit 13 controls an operation of each unit of the circuit according to a calculator control program stored in the storage unit 14, and executes various types of arithmetic processing according to key input signals from the key input unit 11 and reception signals received from the outside via the communication unit 16. The control unit 13 includes at least one processor such as a central processing unit (CPU). The communication unit 16 includes a wireless communication device that performs wireless communication with an external device, for example, in accordance with Bluetooth (registered trademark), Bluetooth Low Energy (registered trademark), or another short-range wireless communication standard. The communication unit 16 may have a terminal for connecting a dedicated or general-purpose transmission cable that can be used for communication with an external device.

The calculator control program may be stored in advance in the storage unit 14, or may be read from a portable recording medium M such as a memory card via the medium reading unit 15 and stored in the storage unit 14. The calculator control program may be downloaded from a web server on a communication network via the communication unit 16 and stored in the storage unit 14. The storage unit 14 includes a read only memory (ROM) and a random access memory (RAM), and can store a function formula or the like input by the user in addition to the calculator control program.

In the scientific calculator 10, components shown as multiple blocks in FIG. 2 may be included in a single piece of hardware, or a component shown as a single block in FIG. 2 may be a combination of a plurality of pieces of hardware. For example, the scientific calculator 10 may include a field programmable gate array (FPGA) or an application specific integrated circuit (ASIC) including some or all of the control unit 13 and some or all of the storage unit 14.

Figure 3:
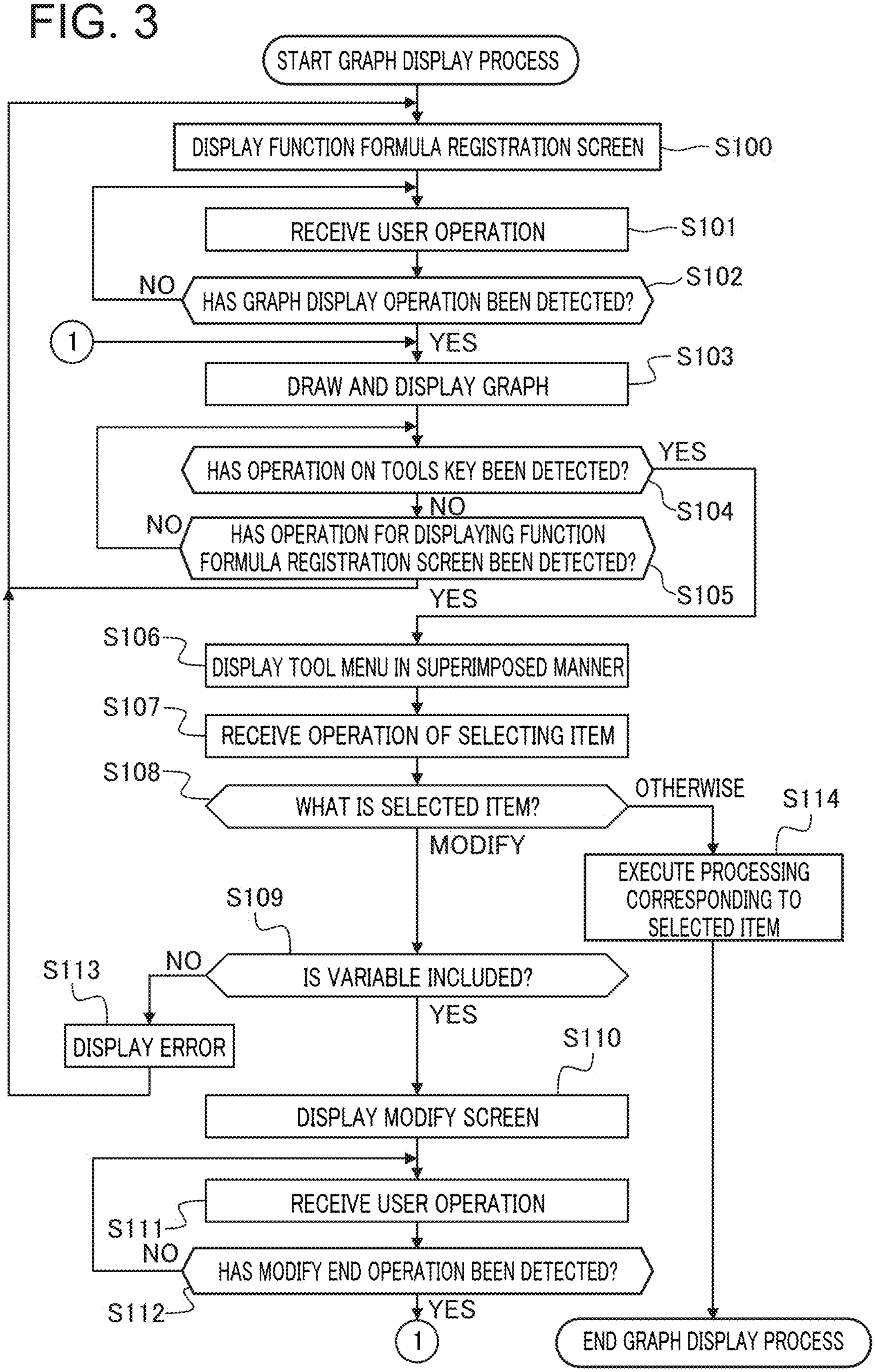
FIG. 3 is a flowchart illustrating an example of a graph display process performed by the scientific calculator according to the first embodiment.

In the scientific calculator 10 as an electronic device configured as described above, the control unit 13 controls an operation of each unit of the circuit according to an instruction described in the calculator control program, and the software and the hardware operate in cooperation, thereby realizing various functions. For example, the scientific calculator 10 can draw a graph of a function formula input using the key input unit 11 or the like, and display the graph on the display unit 12. At the time of drawing a graph of a function formula and displaying the graph of the function formula on the display unit 12, the scientific calculator 10 according to the present embodiment performs a graph display process according to a flowchart exemplified in FIG. 3. An instruction executed by the control unit 13 in the graph display process described with reference to FIG. 3 is included in the calculator control program. For example, when the user performs an operation of selecting graph drawing from a menu screen, the control unit 13 starts the graph display process exemplified in FIG. 3. The processing of each step included in the graph display process is performed by the control unit 13 alone or in cooperation with the key input unit 11, the display unit 12, the storage unit 14, and the like.

First, the control unit 13 causes the display unit 12 to display a function formula registration screen (step S100). Thereafter, the control unit 13 receives registration of a plurality of pieces of function formula information (a set of a relational expression and definition information (see the description below)) by a user operation on the function formula registration screen using the key input unit 11 and selection of any function formula information from the registered plurality of pieces of function formula information (step S101), and waits for a graph display operation to be detected for the selected function formula information (step S102). In step S101, when the received operation is an operation of editing the selected function formula information, the control unit 13 edits the function formula information according to the corresponding operation (e.g., an operation of inputting a function formula or definition information, or an operation of changing or erasing an input function formula or definition information) and changes the display of the display unit 12. When it is determined that a graph display operation is not detected (step S102; NO), the control unit 13 waits for a next user operation. On the other hand, when it is determined that a graph display operation has been detected (step S102; YES), the control unit 13 draws a graph of a function formula included in the function formula information selected from the function formula registration screen, and displays the graph on the display unit 12 (step S103). In step S103, the control unit 13 draws the graph of the function formula, for example, on an xy plane indicating a relationship between a variable (e.g., an x value) of the function formula included in the function formula information and a solution (e.g., a y value), and causes the display unit 12 to display a display area specified based on an x value display range and a y value display range on the xy plane. Hereinafter, the display state of the display unit 12 when the function formula registration screen is displayed will be referred to as a "first display state", and the display state of the display unit 12 when the graph of the function formula included in the function formula information selected on the function formula registration screen is displayed will be referred to as a "second display state". That is, when the graph display operation is detected while the display unit 12 is in the first display state, the control unit 13 of the scientific calculator 10 according to the present embodiment switches the display state of the display unit 12 from the first display state to the second display state.

After step S103, the control unit 13 determines whether or not an operation on the tools key 115 has been detected (step S104), and then determines whether or not an operation for displaying the function formula registration screen has been detected (step S105). Before an operation on the tools key 115 is detected (step S104; NO), when it is determined that an operation for displaying the function formula registration screen has been detected (step S105; YES), the control unit 13 returns to the processing of step S100. In other words, when it is determined that an operation for displaying the function formula registration screen has been detected (step S105; YES), the control unit 13 returns the display state of the display unit 12 from the second display state to the first display state.

Before an operation for displaying the function formula registration screen is detected, when it is determined that an operation on the tools key 115 has been detected (step S104; YES), the control unit 13 displays a tool menu in a superimposed manner on the front side of (in front of) the graph displayed on the display unit 12 (step S106). The tool menu will be described in detail later with reference to FIG. 4C, etc. The tool menu is smaller than the display size of the display unit 12, and may be called a sub-window.

In the tool menu, a plurality of items including an item "MODIFY" for specifying a value in the definition information of the function formula are arranged, and any one of the plurality of items can be selected. When receiving an operation of selecting one of the plurality of items of the displayed tool menu (step S107), the control unit 13 determines whether or not the selected item is "MODIFY" (step S108). When it is determined that the selected item is not MODIFY (step S108; Otherwise), the control unit 13 executes processing corresponding to the selected item (step S114), and ends the graph display process. Furthermore, although not illustrated in FIG. 3, when an operation of pressing a predetermined key such as the back key 113B (see FIG. 1) is detected in a state where the tool menu is displayed, the control unit 13 hides the tool menu, returns the display state of the display unit 12 to the second display state, and repeats the determinations in steps S104 and S105.

On the other hand, when it is determined that the selected item is MODIFY (step S108; MODIFY), the control unit 13 determines whether or not a variable is included as definition information in combination with the function formula corresponding to the graph displayed on the back side of (behind) the tool menu (step S109). The variable is a variable such as a coefficient A (proportional constant) or a coefficient B (intercept), for example, in a function formula y=Ax+B. When it is determined that a variable is not included (step S109; NO), the control unit 13 causes, for example, the display unit 12 to display an error notification screen (step S113). Thereafter, the control unit 13 returns to the processing of step S100. That is, the display state of the display unit 12 is returned to the first display state.

On the other hand, when it is determined that a variable is included (step S109; YES), the control unit 13 causes the display unit 12 to display, for example, a MODIFY screen on which the value corresponding to the variable and the number of steps, which are the definition information of the selected function formula, can be edited (step S110). Hereinafter, the display state of the display unit 12 when the MODIFY screen on which the definition information of the function formula can be edited is displayed will be referred to as a "third display state". That is, when an operation on the tools key 115 is detected while the display unit 12 is in the second display state, and a variable is included as definition information in the function formula of the displayed graph, the control unit 13 of the scientific calculator 10 according to the present embodiment switches the display unit 12 from the second display state to the third display state.

The MODIFY screen includes a graph displayed on the back side of (behind) the tool menu when MODIFY is selected from the tool menu, and an edit area for editing definition information (that is the above-described variable and corresponds to the coefficients A and B of the function formula y=Ax+B) in the function formula corresponding to the graph. The control unit 13 receives a user operation on the MODIFY screen using the key input unit 11 (step S111), and waits until a MODIFY end operation is detected (step S112). In step S111, when the control unit 13 determines that the received operation is an operation of changing the value of the variable in the definition information of the function formula, for example, the value corresponding to the variable is changed according to the corresponding operation, and a graph reflecting the changed value is distinguishably displayed together with the graph before the change. When it is determined that a MODIFY end operation has not been detected (step S112; NO), the control unit 13 waits for a next user operation. On the other hand, when it is determined that a MODIFY end operation is detected (step S112; YES), the control unit 13 hides the MODIFY screen, draws a graph of the selected function formula, and displays the graph on the display unit 12 (step S103). That is, the control unit 13 returns the display state of the display unit 12 from the third display state to the second display state. The MODIFY end operation may be, for example, an operation of pressing the back key 113B (see FIG. 1).

In this manner, in the scientific calculator 10 according to the present embodiment, when a predetermined key (e.g., the tools key 115) is pressed in the second display state in which the graph of the function formula is displayed on the display unit 12, a switch to the MODIFY screen for changing the content of the definition information of the function formula can be selected from the tool menu arranged in a superimposed manner in front of the displayed graph.

Figure 4A:
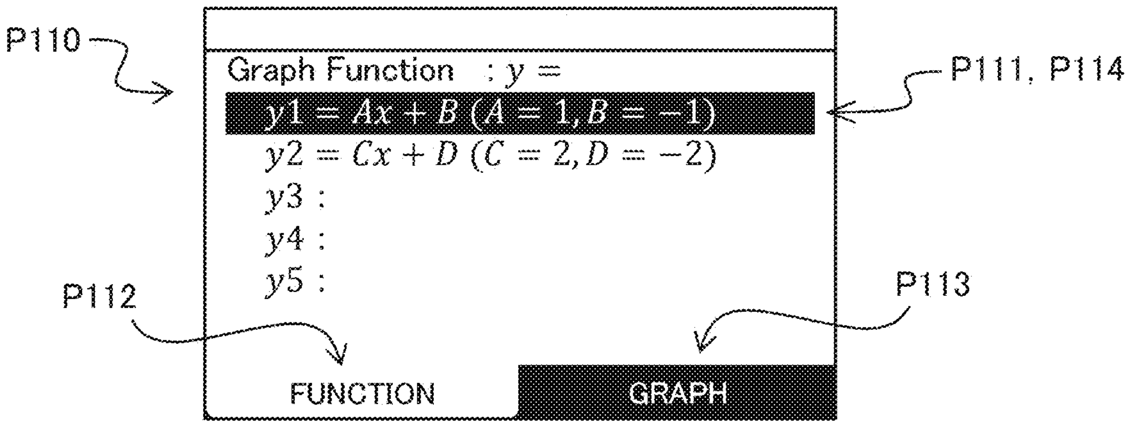
FIG. 4A is a diagram illustrating a first example of a screen transition of a display unit, in which a function formula registration screen is displayed.

FIG. 4A illustrates an example of a function formula registration screen P110 displayed on the display unit 12 in step S100. The function formula registration screen P110 overlaps with a graph display screen P120 exemplified in FIG. 4B, and the screen displayed on the display unit 12 can be switched by a first tab P112 and a second tab P113 on the lower side of the screen. When the first tab P112 labeled "FUNCTION" is selected, the function formula registration screen P110 is displayed, and when the second tab P113 labeled "GRAPH" is selected, the graph display screen P120 is displayed.

On the function formula registration screen P110, for example, function formula information regarding five solutions y1 to y5 can be registered (input). The user can select one of the five solutions y1 to y5 (function formula information) by operating the [↑] (up) key 113U (first key) or the [↓] (down) key 113D (second key) of the cursor key group 113. The selected solution (function formula information) is shown in a different display format from the other solutions (function formula information). In FIG. 4A, function formula information (function formula P111 and definition information P114) of y1 is selected, and a combination of background and character colors is opposite to that for the other function formula information (that is, displayed in an inverted manner).

When the confirmation key 113C (see FIG. 1) is pressed after the function formula information is selected, a variable or the like can be input as definition information of the function formula included in the selected function formula information. In the function formula P111 of FIG. 4A, a linear function y1=Ax+B is input with x as a variable, and values 1 and −1 are input as the definition information P114 in association with the variables A and B, respectively, so that (A=1, B=−1) is displayed. The function formula P111 and the definition information P114 are combined and associated with each other, and displayed as function formula information. When the user presses the back key 113B in the first display state in which the function formula registration screen P110 is displayed, the input of the variables and the like is confirmed, and the function formula information is registered.

When the second tab P113 is selected in a state where the function formula information registered on the function formula registration screen P110 in FIG. 4A is selected, the display state of the display unit 12 is switched from the first display state in which the function formula registration screen P110 is displayed to the second display state in which the graph display screen P120 is displayed. The operation of selecting the second tab P113 on the function formula registration screen P110 can be an example of an operation (first predetermined operation) detected as a graph display operation in step S102 of FIG. 3.

The graph display screen P120 of FIG. 4B has a configuration in which the first tab P112 and the second tab P113 are arranged below a graph display area P121. In the graph display area P121, a graph P122 (a graph of y1=Ax+B (A=1, B=−1) in FIG. 4B) of the function formula information selected on the function formula registration screen P110 is displayed, for example, based on the x value display range and the y value display range set at the time of displaying the graph.

Figure 4B:
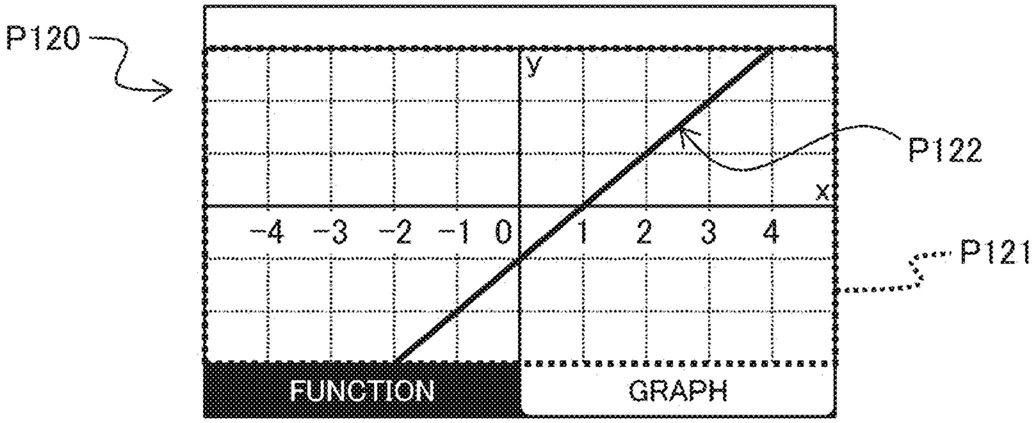
FIG. 4B is a diagram illustrating the first example of the screen transition of the display unit, in which a graph display screen is displayed.
Figure 4C:
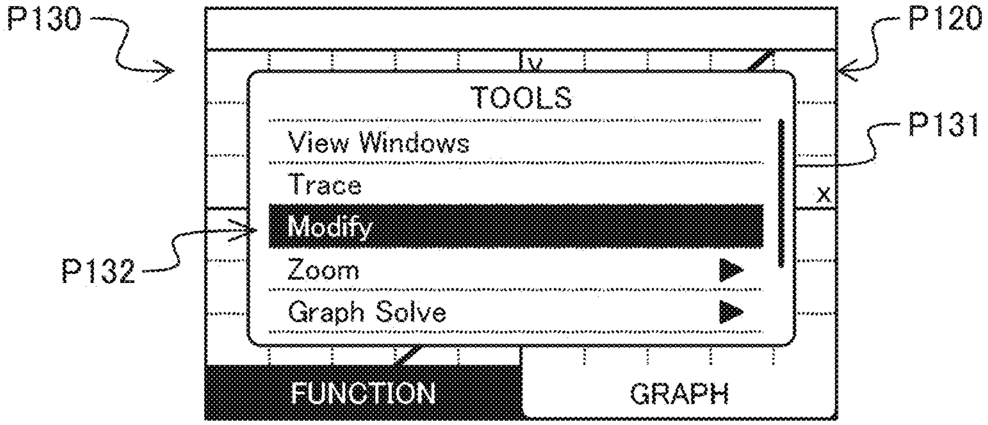
FIG. 4C is a diagram illustrating the first example of the screen transition of the display unit, in which a tool menu is displayed.

In the scientific calculator 10 according to the present embodiment, when the tools key 115 is pressed while the graph display screen P120 is displayed on the display unit 12, a screen in which a tool menu P131 is arranged in a superimposed manner in front of the graph display screen P120, like a tool selection screen P130 in FIG. 4C, is displayed on the display unit 12. The tool menu P131 includes a plurality of selection items including an item "Modify" P132. In a case where all of the plurality of selection items cannot be displayed in the single tool menu P131, for example, the selection items to be displayed can be switched by operating the [↑] (up) key 113U (first key), the [↓] (down) key 113D (second key), or the [↑↓] (scroll) key 113S.

When "View Window" is selected from the tool menu P131 exemplified in FIG. 4C, the x value display range and scale (scale interval) and the y value display range and scale in the graph display area P121 can be edited. When "Trace" is selected, the pointer can be moved along the graph P122 displayed in the graph display area P121, and an x value and a y value of the pointer position can be displayed. When "Zoom" is selected, the graph P122 displayed in the graph display area P121 can be enlarged or reduced. When "Graph Solve" is selected, the graph can be analyzed to determine a maximum value, a minimum value, a y-axis intercept, and the like. The right triangle in each of "Zoom" and "Graph Solve" indicates that there is a sub-menu. For example, when "Zoom" is selected, a sub-menu including a plurality of options from which how to enlarge or reduce the graph P122 can be selected is displayed.

When the item "Modify" P132 is selected in the tool menu P131 exemplified in FIG. 4C, the control unit 13 determines whether or not a variable is included as definition information in the function formula information of the function formula of the graph displayed on the graph display screen P120 overlapping the tool menu P131 (step S109). The function formula information of the graph P122 displayed on the graph display screen P120 of FIG. 4C is a function formula y1=Ax+B and definition information (A=1, B=−1), and the definition information includes a variable. Therefore, the control unit 13 displays a MODIFY screen P140 exemplified in FIG. 5A on the display unit 12 (step S110).

Figure 5A:
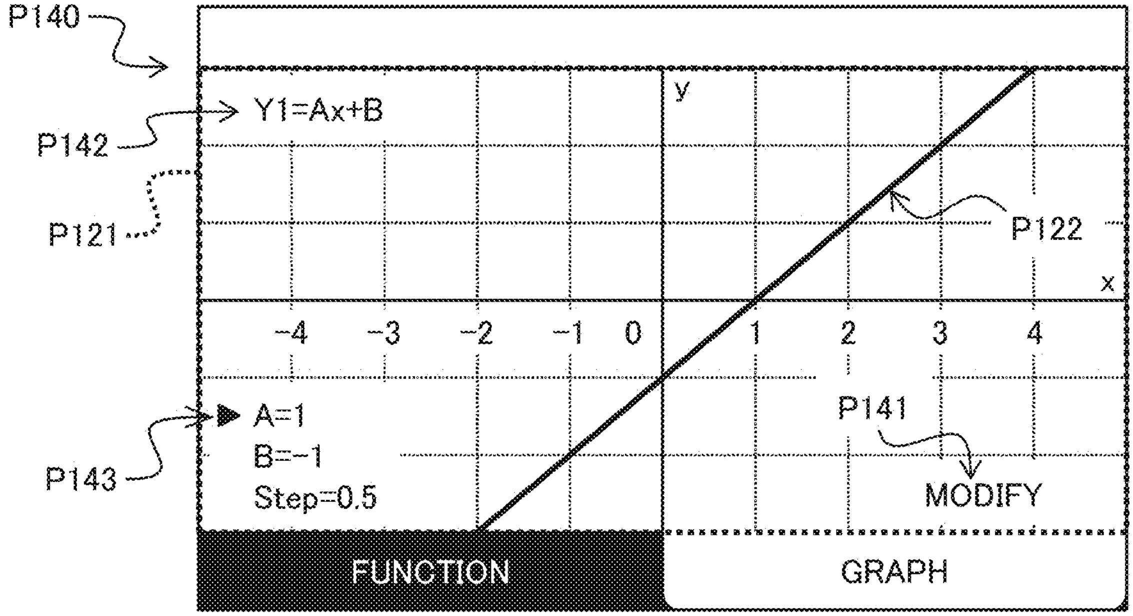
FIG. 5A is a diagram illustrating the first example of the screen transition of the display unit, in which a MODIFY screen is displayed.
Figure 5B:
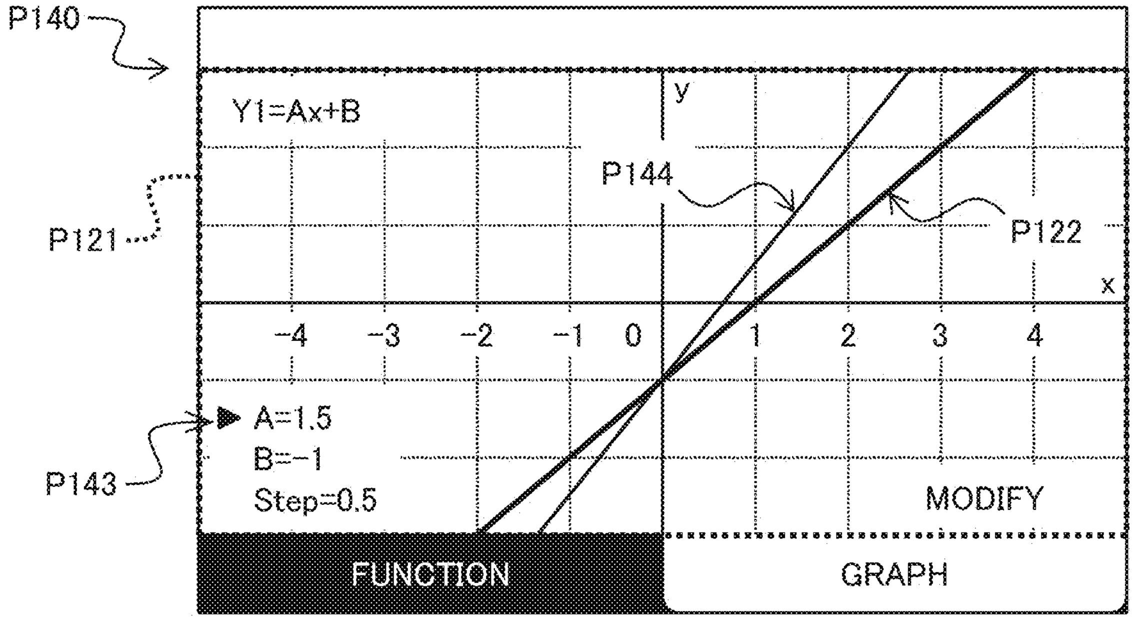
FIG. 5B is a diagram illustrating the first example of the screen transition of the display unit, in which a list of variables A and B is further displayed on the MODIFY screen.

The MODIFY screen P140 of FIG. 5A may be a screen obtained by adding a function capable of specifying (editing or change) a value included in the definition information of the function formula to the graph display screen P120 exemplified in FIG. 4B. In a graph display area P121 on the MODIFY screen P140, in addition to a graph P122, an object P141 indicating that the screen is a MODIFY screen, a function formula P142, and a list P143 of specifiable values are displayed. In the list P143 of FIG. 5B, variables A and B, which are definition information in the function formula P142 (y1=Ax+B), are displayed. When the user selects the variable A and changes the value of the variable A from 1 to 1.5, the control unit 13 detects this change, draws a graph P144 of the function formula information y1=Ax+B (A=1.5, B=−1), and displays the graph in the graph display area P121. The graph P144 is displayed by, for example, a line (a solid line, a broken line, a dotted line, or the like) having a thickness, a color, or a type different from that of the graph P122 to be distinguishable from the graph P122.

In this manner, in the scientific calculator 10 according to the present embodiment, it is possible to shift from the second display state, in which the graph P122 of the function formula is displayed, to the third display state, in which the MODIFY screen P140 is displayed, without going through the first display state, in which the function formula registration screen P110 is displayed, and display the graph P144 in which the value included in the definition information of the selected function formula information is designated (edited or changed). In addition, for example, by an operation of pressing the back key 113B, it is possible to easily switch (return) from the state in which the tool selection screen P130 or the MODIFY screen P140 is displayed to the second display state in which the graph P122 of the function formula is displayed.

As described above, the scientific calculator 10 according to the present embodiment enables the user to easily perform an operation of switching from the second display state, in which the graph of the function formula is drawn and displayed, to the third display state, in which the MODIFY screen P140 on which the definition information of the function formula can be designated (edited or changed) is displayed. In addition, the scientific calculator 10 according to the present embodiment is capable of displaying an error screen when the displayed graph is a function formula not including a variable (a function formula not including an editable element), so that the user can easily know that it is not possible to switch to the third display state, and furthermore, capable of reliably supporting the user in executing a technical task (using a graph drawing function in the scientific calculator) by an interaction process between the user and the scientific calculator 10.

Note that the graph display process executed by the scientific calculator 10 according to the present embodiment is not limited to the process according to the flowchart exemplified in FIG. 3. For example, steps S109 and S113 in the flowchart exemplified in FIG. 3 may be omitted by always setting the definition information included in the function formula information as a variable that can be edited on the MODIFY screen P140.

Second Embodiment

Figure 6:
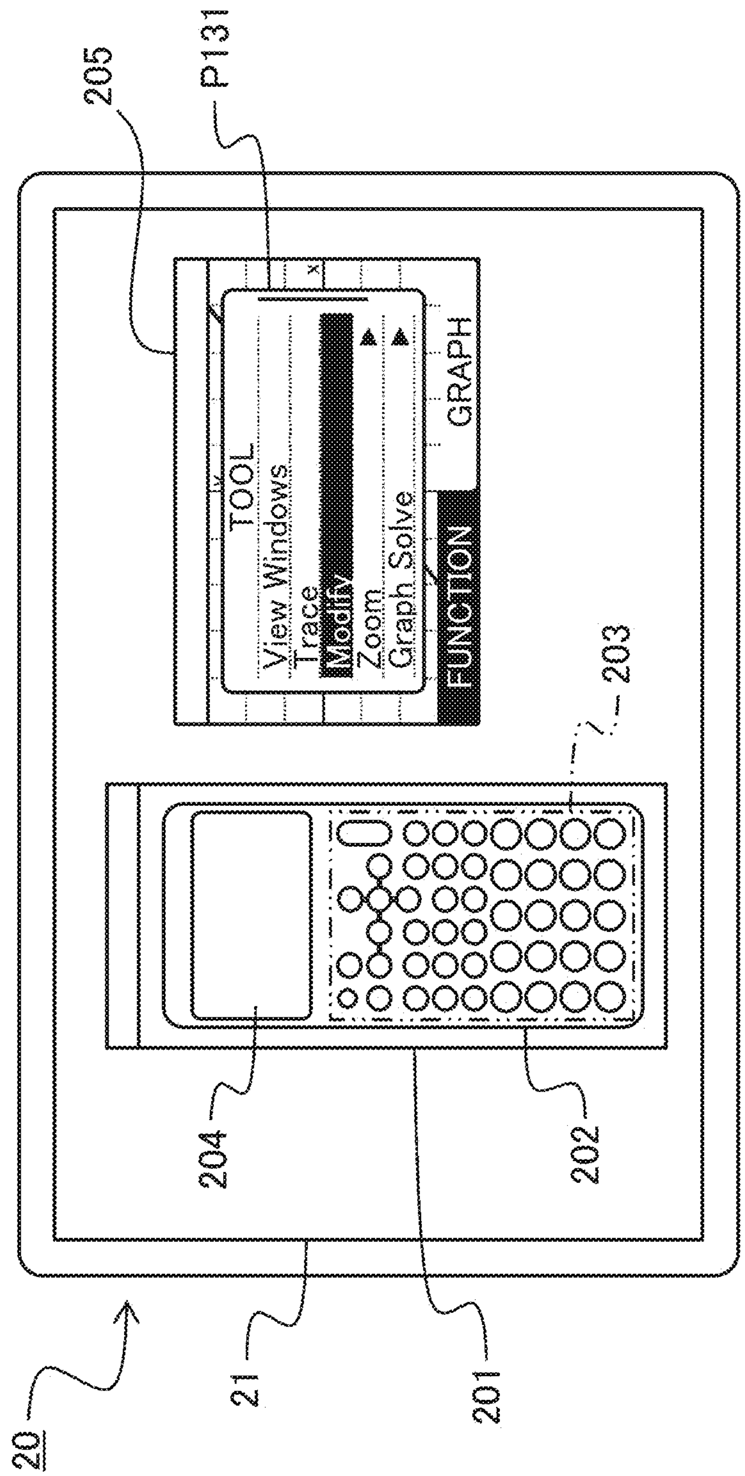
FIG. 6 is a front view illustrating an example of an external configuration of an electronic device according to a second embodiment.
Figure 7:
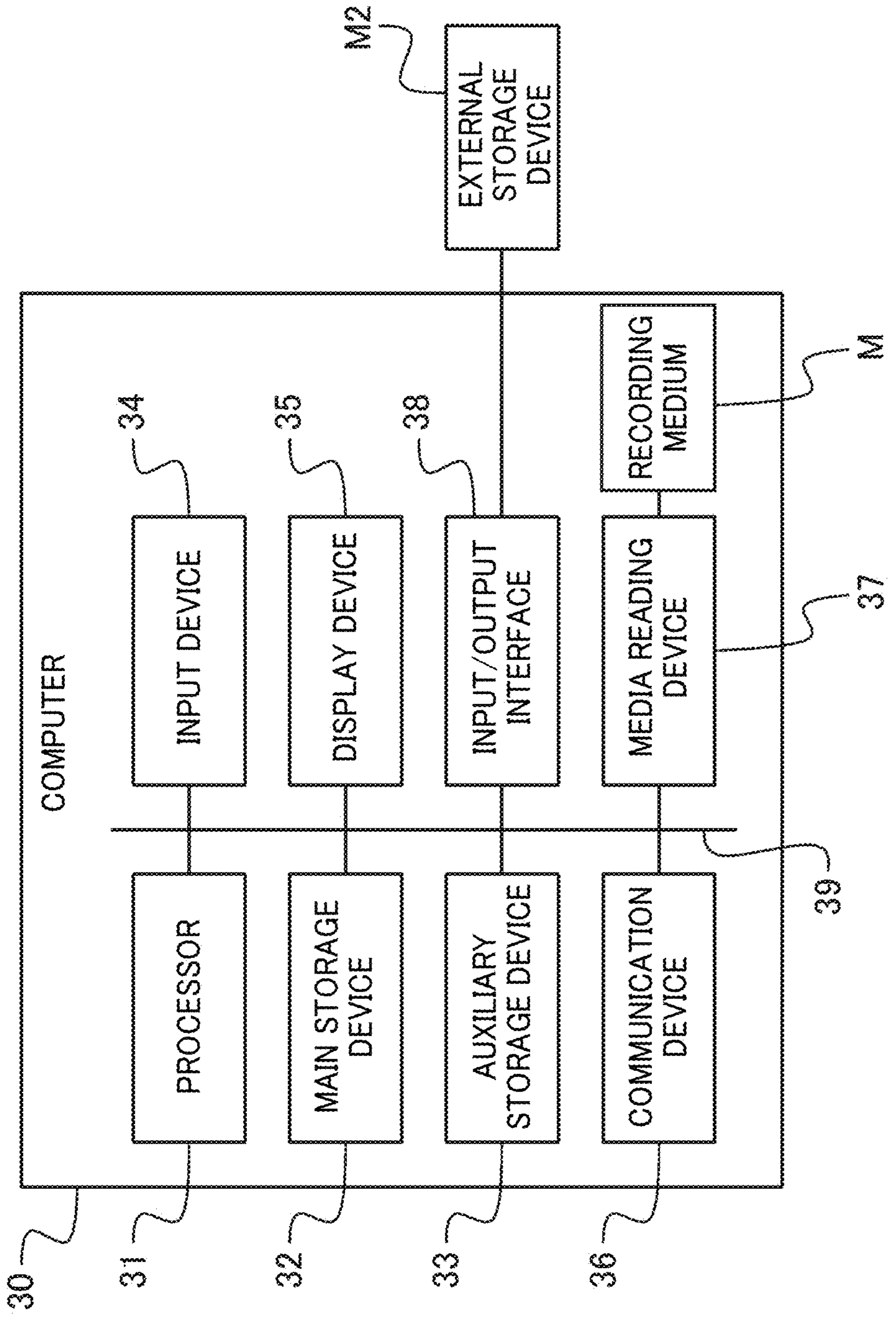
FIG. 7 is a block diagram illustrating an example of a hardware configuration of a computer.

An electronic device 20 exemplified in FIG. 6 includes a touch panel display 21 serving as both an input unit and a display unit, such as a tablet computer or a smartphone. The electronic device 20 according to the present embodiment may be a computer 30 exemplified in FIG. 7, or may be another information processing apparatus including the computer 30 or providing functions equivalent to those of the computer 30, and can execute a calculator control program (emulator) including instructions related to the graph display process described above with reference to FIG. 3. That is, the electronic device 20 easily updates the calculator control program (modifies or adds functions), for example, as compared with a dedicated graph display device such as the scientific calculator 10 described in the first embodiment.

The computer 30 includes a processor 31, a main storage device 32, an auxiliary storage device 33, an input device 34, a display device 35, a communication device 36, a media reading device 37, and an input/output interface 38, and these hardware elements are connected to each other by a bus 39.

The processor 31 causes the computer 30 to operate as the scientific calculator 10 according to the first embodiment, for example, by executing a calculator control program including a program portion corresponding to the graph display process described above with reference to FIG. 3. The processor 31 may include one or more CPUs and other processors. The main storage device 32 and the auxiliary storage device 33 store a program executed by the processor 31, data referred to by the processor 31 that executes the program, data generated by the processor 31 that executes the program, and the like. The input device 34 may be an input device (e.g., a keyboard, a mouse, or the like) that can be used as the key input unit 11 of the scientific calculator 10 according to the first embodiment. The display device 35 may be a dot-matrix type display device that can be used as the display unit 12 of the scientific calculator 10 according to the first embodiment. In a case where the computer 30 includes a touch panel display, the input device 34 may include a position detection device disposed to overlap a display surface of the display device 35.

The communication device 36 may be a wireless communication device usable as the communication unit 16 of the scientific calculator 10 according to the first embodiment, or a communication device having a terminal to which a communication cable can be connected. The medium reading device 37 corresponds to the medium reading unit 15 of the scientific calculator 10 according to the first embodiment, and may be a device capable of reading information stored in a portable recording medium M and writing information to the portable recording medium M.

The electronic device 20 which may be the computer 30 can display a calculator window 201 including a scientific calculator image 202 on the touch panel display 21 as illustrated in FIG. 6 by executing the calculator control program (emulator). The scientific calculator image 202 includes a key input unit 203 and a display unit 204 corresponding to the key input unit 11 and the display unit 12 of the scientific calculator 10. When an operation of pressing a button of the key input unit 203 of the scientific calculator image 202 is performed, a function assigned to the pressed button is executed, and an execution result is displayed in a display area of the touch panel display 21. That is, the user of the electronic device 20 can use the electronic device 20 as a scientific calculator by performing an operation of pressing a button (key) arranged in the key input unit 203 of the scientific calculator image 202 in the calculator window 201. When the electronic device 20 is used as a scientific calculator, a function formula registration screen P100, a graph display screen P120, a tool selection screen P130, a MODIFY screen P140, and the like can be displayed on the touch panel display 21. These screens may be displayed on the display unit 204 of the scientific calculator image 202, or may be displayed as a window 205 separate from the calculator window 201 as exemplified in FIG. 6. A tool selection screen P130 including a tool menu P131 is displayed in the window 205 exemplified in FIG. 6.

In a case where the electronic device 20 is used as a scientific calculator, for example, when a button corresponding to the tools key 115 (see FIG. 1) arranged in the key input unit 203 of the scientific calculator image 202 is pressed while the graph display screen P120 is displayed in the window 205, the tool menu P131 is displayed in a superimposed manner in front of the graph display screen P120 in the window 205. In this manner, by displaying the graph display screen P120 and the like in the window 205 separate from the display unit 204 of the scientific calculator image 202, the number of dots in the graph display area P121 can be larger than the number of dots in the display unit 12 (see FIG. 1) of the scientific calculator 10, and the detailed (high-definition) graph P122 can be displayed.

Figure 8:
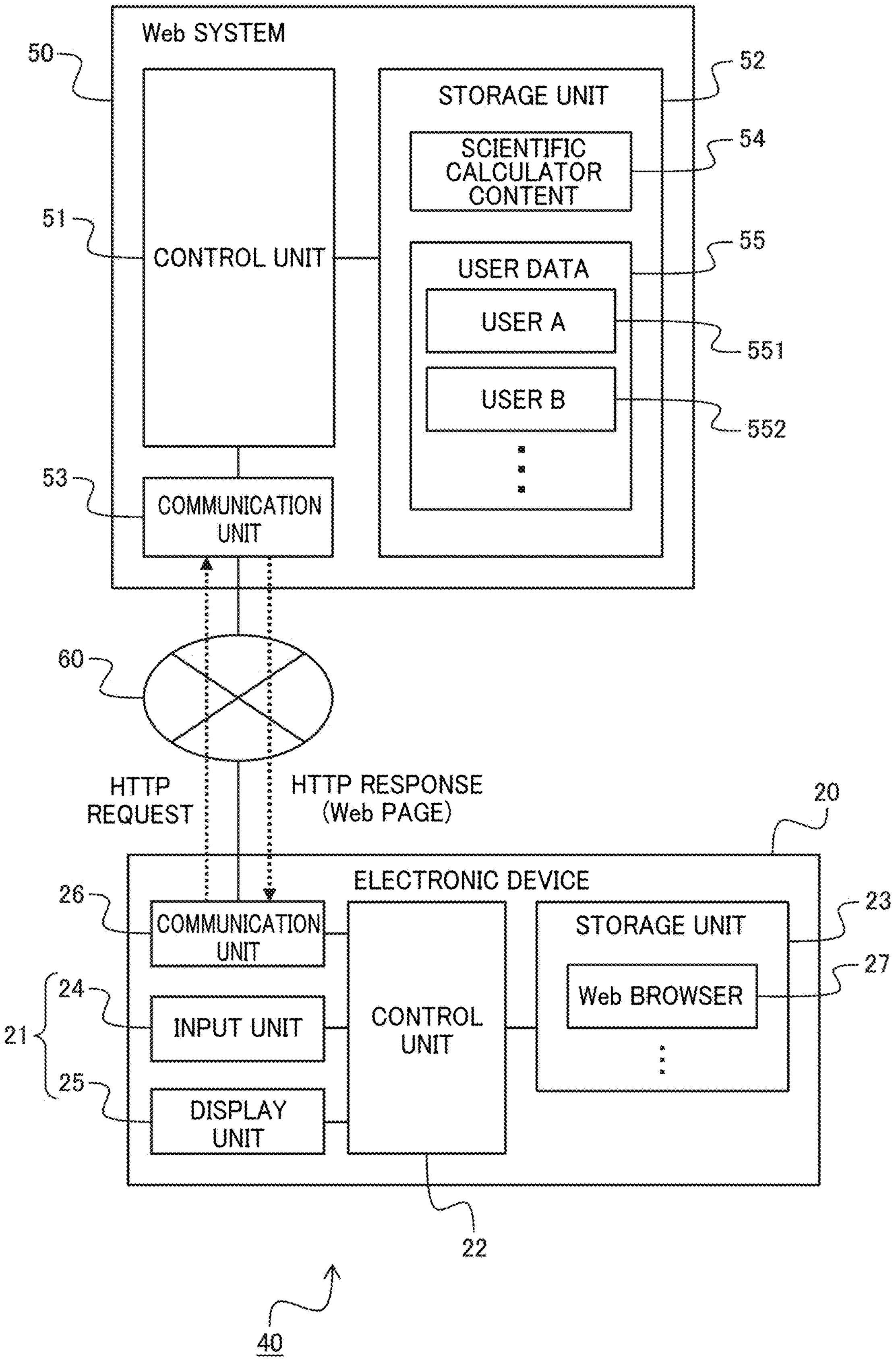
FIG. 8 is a block diagram illustrating an example of a configuration of a learning system using a communication network.

A learning system 40 exemplified in FIG. 8 may be, for example, a system for children, pupils, students, and other persons who learn using a scientific calculator, and includes an electronic device 20 and a web system 50. The electronic device 20 includes a control unit 22, a storage unit 23, an input unit 24, a display unit 25, and a communication unit 26. The input unit 24 and the display unit 25 may be provided as the touch panel display 21 in the electronic device 20. The control unit 22 executes a program of a web browser 27 stored in the storage unit 23, generates an HTTP request to be transmitted to the web system 50, displays a web page according to an HTTP response from the web system 50, and the like. The communication unit 26 transmits the HTTP request and receives the HTTP response.

The web system 50 is a system that provides a function of a scientific calculator using a communication network 60, and includes a control unit 51, a storage unit 52, and a communication unit 53. The web system 50 may be configured by, for example, a single server or a plurality of servers. For example, the web system 50 may be configured by a web server, an application server, and a database server. The term “server” in the present specification may be replaced with “computer”.

The control unit 51 of the web system 50 controls an operation of the web system 50. For example, the control unit 51 performs processing according to an HTTP request from the electronic device 20, generates a web page according to a result of the processing, and transmits the web page to the electronic device 20 as an HTTP response. The processing according to the HTTP request may be, for example, processing of generating a web page including the scientific calculator image 202 (see FIG. 6), processing of generating a web page including the function formula registration screen P110, processing of generating a web page including the graph display screen P120, or the like.

The storage unit 52 stores scientific calculator content 54 to be provided to the electronic device 20 via the communication network 60, user data 55, other data (not illustrated), programs, and the like. The scientific calculator content 54 may be a web application that enables the electronic device 20 to be used as a scientific calculator, and includes a calculator control program. The user data 55 includes various types of information individually set and registered for each user who uses the scientific calculator content 54. User data 551 for user A includes, for example, information such as identification information of the user A, settings of the scientific calculator, and function formulas created by the user A. User data 552 for user B includes, for example, information such as identification information of the user B, settings of the scientific calculator, and function formulas created by the user B. The settings of the scientific calculator include, for example, settings of x and y value display ranges of the graph display area P121 of the graph display screen P120.

The communication unit 53 performs wireless or wired communication with a communication device connected to the communication network 60, and connects the web system 50 to the communication network 60. In the learning system 40 exemplified in FIG. 8, it is only required that the web system 50 can calculate a function formula and the electronic device 20 can execute the web browser 27.

Note that the present invention is not limited to the above-described embodiments, and various changes, substitutions, and modifications may be made without departing from the spirit of the technical idea. In addition, if the technical idea can be realized by another way due to technological advances or other derived technologies, the present invention may be implemented by using that method. Therefore, the claims cover all aspects of implementation that may fall within the scope of the technical idea.

According to the above embodiment, it is possible to easily change a variable of a function formula of a displayed graph.

What is claimed is:

1. A graph display device comprising:

a controller configured to execute processes comprising:

controlling a display state of a display unit to perform display in a first display state in which a plurality of pieces of function formula information are displayed on the display unit;

in response to selection of specific function formula information, from among the plurality of pieces of function formula information displayed in the first display state, and detection of an instruction to display a graph corresponding to the selected function formula information, switching the display state of the display unit from the first display state to a second display state in which a graph of a function formula included in the selected function formula information is displayed;

in response to detection of a first predetermined operation while the display state of the display unit is the second display state, determining whether or not the function formula included in the selected function formula information includes definition information in which a value input to a variable included in the function formula is associated with a predetermined variable;

in response to determining that the definition information is included in the function formula, switching the display state of the display unit from the second display state to a third display state in which a screen including (i) the graph, (ii) an area for designating the value in the definition information, and (iii) a changed graph based on the function formula reflecting a change in the value is displayed, without switching the display state of the display unit back to the first display state; and in response to detection of a second predetermined operation while the display state of the display unit is the third display state, switching the display state of the display unit from the third display state to the second display state such that the changed graph is displayed on the display unit and the graph is not displayed on the display unit.

2. The graph display device according to claim 1, wherein the processes further comprise:

in response to detecting the first predetermined operation, displaying a sub-window for a selection item menu related to the graph of the function formula in a superimposed manner in front of a current graph display screen currently displayed on the display unit, and in response to selection of an item corresponding to an instruction to switch to the third display state from the selection item menu, switching the display state of the display unit from the second display state to the third display state.

3. A display control method executed by a graph display device, the display control method comprising:

controlling a display state of a display unit to perform display in a first display state in which a plurality of pieces of function formula information are displayed on the display unit;

in response to selection of specific function formula information, from among the plurality of pieces of function formula information displayed in the first state, and detection of an instruction to display a graph corresponding to the selected function formula information, switching the display state of the display unit from the first display state to a second display state in which a graph of a function formula included in the selected function formula information is displayed;

in response to detection of a first predetermined operation while the display state of the display unit is the second display state, determining whether or not the function formula included in the selected function formula information includes definition information in which a value input to a variable included in the function formula is associated with a predetermined variable;

in response to determining that the definition information is included in the function formula, switching the display state of the display unit from the second display state to a third display state in which a screen including (i) the graph, (ii) an area for designating the value in the definition information, and (iii) a changed graph based on the function formula reflecting a change in the value is displayed, without switching the display state of the display unit back to the first display state; and in response to detection of a second predetermined operation while the display state of the display unit is the third display state, switching the display state of the display unit from the third display state to the second display state such that the changed graph is displayed on the display unit and the graph is not displayed on the display unit.

4. The display control method according to claim 3, further comprising:

in response to detection of the first predetermined operation, displaying, by the graph display device, a sub-window for a selection item menu related to the graph of the function formula in a superimposed manner in front of a current graph display screen currently displayed on the display unit; and in response to selection of an item corresponding to an instruction to switch to the third display state from the selection item menu, switching, by the graph display device, the display state of the display unit from the second display state to the third display state.

5. A non-transitory recording medium that stores program readable by a computer, wherein the program causes the computer to function to execute processes comprising:

controlling a display state of a display unit to perform display in a first display state in which a plurality of pieces of function formula information are displayed on the display unit;

in response to selection of specific function formula information, from among the plurality of pieces of function formula information displayed in the first display state, and detection of an instruction to display a graph corresponding to the selected function formula information, switching the display state of the display unit from the first display state to a second display state in which a graph of a function formula included in the selected function formula information is displayed;

in response to detection of a first predetermined operation while the display state of the display unit is the second display state, determining whether or not the function formula included in the selected function formula information includes definition information in which a value input to a variable included in the function formula is associated with a predetermined variable;

in response to determining that the definition information is included in the function formula, switching the display state of the display unit from the second display state to a third display state in which a screen including (i) the graph, (ii) an area for designating the value in the definition information, and (iii) a changed graph based on the function formula reflecting a change in the value is displayed, without switching the display state of the display unit back to the first display state; and in response to detection of a second predetermined operation while the display state of the display unit is the third display state, switching the display state of the display unit from the third display state to the second display state such that the changed graph is displayed on the display unit and the graph is not displayed on the display unit.

6. The recording medium according to claim 5, wherein the processes further comprise:

in response to detection of the first predetermined operation, displaying a sub-window for a selection item menu related to the graph of the function formula in a superimposed manner in front of a current graph display screen currently displayed on the display unit, and in response to selection of an item corresponding to an instruction to switch to the third display state from the selection item menu, switching the display state of the display unit from the second display state to the third display state.

* * * * *